US012762773B2

(12) United States Patent
Wang et al.

(10) Patent No.: US 12,762,773 B2
(45) Date of Patent: Oct. 13, 2026

(54) LOW-DIMENSIONAL MANIFOLD CONSTRAINED DISENTANGLEMENT NETWORK FOR METAL ARTIFACT REDUCTION

(71) Applicant: Rensselaer Polytechnic Institute, Troy, NY (US)

(72) Inventors: Ge Wang, Loudonville, NY (US); Chuang Niu, Troy, NY (US); Wenxiang Cong, Albany, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 546 days.

(21) Appl. No.: 17/859,186

(22) Filed: Jul. 7, 2022

(65) Prior Publication Data

US 2023/0026961 A1 Jan. 26, 2023

Related U.S. Application Data

(60) Provisional application No. 63/358,600, filed on Jul. 6, 2022, provisional application No. 63/218,914, filed on Jul. 7, 2021.

(51) Int. Cl.

*G06T 12/30* (2026.01)
*G06N 3/045* (2023.01)
*G06T 5/80* (2024.01)

(52) U.S. Cl.

CPC ............. *G06T 12/30* (2026.01); *G06N 3/045* (2023.01); *G06T 5/80* (2024.01); *G06T 2207/10081* (2013.01)

(58) Field of Classification Search

CPC ..................... G06T 11/008; G06T 5/80; G06T 2207/10081; G06N 3/045

See application file for complete search history.

(56) References Cited

U.S. PATENT DOCUMENTS 8,503,750 B2 8/2013 Benson et al.
8,768,027 B2 7/2014 Chen et al.
(Continued)

FOREIGN PATENT DOCUMENTS

EP 3404615 A1 11/2018
WO 2020033355 A1 2/2020

OTHER PUBLICATIONS

Liao, Haofu, et al. "ADN: artifact disentanglement network for unsupervised metal artifact reduction." IEEE Transactions on Medical Imaging 39.3 (2019): 634-643. (Year: 2019).*
(Continued)

*Primary Examiner* — Ross Varndell
*Assistant Examiner* — Nhut Huy Pham
(74) *Attorney, Agent, or Firm* — Barclay Damon LLP; Anthony P. Gangemi

(57) ABSTRACT

In one embodiment, there is provided an apparatus for low-dimensional manifold constrained disentanglement for metal artifact reduction (MAR) in computed tomography (CT) images. The apparatus includes a patch set construction module, a manifold dimensionality module, and a training module. The patch set construction module is configured to construct a patch set based, at least in part on training data. The manifold dimensionality module is configured to determine a dimensionality of a manifold. The training module is configured to optimize a combination loss function comprising a network loss function and the manifold dimensionality. The optimizing the combination loss function includes optimizing at least one network parameter.

17 Claims, 4 Drawing Sheets

400

(56) References Cited

U.S. PATENT DOCUMENTS

| | | | |
|---|---|---|---|
| 9,074,986 B2 | 7/2015 | Pal et al. | |
| 10,013,779 B2 | 7/2018 | Silver et al. | |
| 10,089,720 B2 | 10/2018 | Koehler et al. | |
| 10,643,319 B2 | 5/2020 | Chan et al. | |
| 2019/0164288 A1 | 5/2019 | Wang et al. | |
| 2019/0244346 A1 | 8/2019 | Schafer | |
| 2019/0311505 A1 | 10/2019 | Helm et al. | |
| 2019/0325621 A1 | 10/2019 | Wang et al. | |
| 2019/0328348 A1 | 10/2019 | De Man et al. | |
| 2020/0005498 A1 | 1/2020 | Wang et al. | |
| 2020/0111194 A1* | 4/2020 | Wang | G06T 3/4076 |

OTHER PUBLICATIONS

Wang et al. (2021). IDOL-Net: An Interactive Dual-Domain Parallel Network for CT Metal Artifact Reduction (Version 1). arXiv. https://doi.org/10.48550/ARXIV.2104.01405 (Year: 2021).*

Liao, Haofu, et al. "ADN: artifact disentanglement network for unsupervised metal artifact reduction." IEEE Transactions on Medical Imaging 39.3 (2019): 634-643, published Nov. 28, 2019.*

Osher, Stanley, Zuoqiang Shi, and Wei Zhu. "Low dimensional manifold model for image processing." SIAM Journal on Imaging Sciences 10.4 (2017): 1669-1690. (Year: 2017).*

Cong, Wenxiang, et al. "CT image reconstruction on a low dimensional manifold." Inverse problems and imaging (Springfield, Mo.) 13.3 (2019): 449. (Year: 2019).*

Liao, Haofu, et al. "ADN: artifact disentanglement network for unsupervised metal artifact reduction." IEEE Transactions on Medical Imaging 39.3: 634-643, published Nov. 28, 2019 (Year: 2019).*

Liao, Haofu et al. "ADN: artifact disentanglement network for unsupervised metal artifact reduction." IEEE Transactions on Medical Imaging 39.3 (Year: 2019).*

Cong, Wenxiang, et al. "CT image reconstruction on a low dimensional manifold." Inverse problems and imaging (Springfield, Mo.) 13.3 (Year: 2019).*

H. Liao, et al., "ADN: Artifact Disentanglement Network for Unsupervised Metal Artifact Reduction," IEEE Transactions on Medical Imaging, vol. 39, No. 3, pp. 634-643, Mar. 2020.

S. Osher, et al., "Low Dimensional Manifold Model for Image Processing," SIAM Journal on Imaging Sciences, vol. 10, No. 4, pp. 1669-1690, 2017.

H. Liao, et al., "ADN: Artifact Disentanglement Network for Unsupervised Metal Artifact Reduction," arXiv: 1908.01104, v4, Nov. 28, 2019, https://arxiv.org/abs/1908.01104.

S. Osher, et al., "Low Dimensional Manifold Model for Image Processing," https://shizqi.github.io/papers/low_dimensional_manifold.pdf.

* cited by examiner

LOW-DIMENSIONAL MANIFOLD CONSTRAINED DISENTANGLEMENT NETWORK FOR METAL ARTIFACT REDUCTION

CROSS REFERENCE TO RELATED APPLICATION(S)

This application claims the benefit of U.S. Provisional Application No. 63/218,914, filed Jul. 7, 2021, and U.S. Provisional Application No. 63/358,600, filed Jul. 6, 2022, which are incorporated by reference as if disclosed herein in their entireties.

GOVERNMENT LICENSE RIGHTS

This invention was made with government support under award numbers CA233888, CA237267, CA264772, EB026646, HL151561, and EB031102, all awarded by the National Institutes of Health (NIH). The government has certain rights in the invention.

FIELD

The present disclosure relates to metal artifact reduction, in particular to, a low-dimensional manifold constrained disentanglement network for metal artifact reduction.

BACKGROUND

Metal objects in a patient, such as dental fillings, artificial hips, spine implants, and surgical clips, can degrade the quality of computed tomography (CT) images. The metal objects in the field of view strongly attenuate or completely block the incident x-ray beams. Reconstructed images from the compromised/incomplete data are then themselves corrupted. The reconstructed images may include metal artifacts that show as bright or dark streaks. The metal artifacts can significantly affect medical image analysis and subsequent clinical treatment.

SUMMARY

In some embodiments, there is provided an apparatus for metal artifact reduction (MAR) in computed tomography (CT) images. The apparatus includes a patch set construction module, a manifold dimensionality module, and a training module. The patch set construction module is configured to construct a patch set based, at least in part on training data. The manifold dimensionality module is configured to determine a dimensionality of a manifold. The training module is configured to optimize a combination loss function including a network loss function and the manifold dimensionality. The optimizing the combination loss function includes optimizing at least one network parameter.

In some embodiments of the apparatus, the training data includes at least one of paired images and/or unpaired images. The paired images correspond to synthesized paired data, and the unpaired images correspond to unpaired clinical data.

In some embodiments of the apparatus, the patch set construction module includes at least one of an artifact correction branch and an artifact-free branch.

In some embodiments of the apparatus, each branch includes an encoder, a decoder and a convolution layer.

In some embodiments of the apparatus, the network loss function is selected from the group including a paired learning supervised loss function, and an unpaired learning artifact disentanglement network loss function.

In some embodiments of the apparatus, the optimizing includes adversarial learning.

In some embodiments of the apparatus, the network loss function is associated with a disentanglement network.

In some embodiments, there is provided a method for metal artifact reduction (MAR) in computed tomography (CT) images. The method includes constructing, by a patch set construction module, a patch set based, at least in part on training data. The method includes determining, by a manifold dimensionality module, a dimensionality of a manifold. The method includes optimizing, by a training module, a combination loss function. The combination loss function includes a network loss function and the manifold dimensionality. The optimizing the combination loss function includes optimizing at least one network parameter.

In some embodiments of the method, the training data includes at least one of paired images and/or unpaired images. The paired images correspond to synthesized paired data, and the unpaired images correspond to unpaired clinical data.

In some embodiments of the method, the patch set construction module includes at least one of an artifact correction branch and an artifact-free branch.

In some embodiments of the method, each branch includes an encoder, a decoder and a convolution layer.

In some embodiments of the method, the network loss function is selected from the group including a paired learning supervised loss function, and an unpaired learning artifact disentanglement network loss function.

In some embodiments of the method, the optimizing includes adversarial learning.

In some embodiments, there is provided a system for metal artifact reduction (MAR) in computed tomography (CT) images. The system includes a computing device that includes a processor, a memory, an input/output circuitry, and a data store. The system further includes a patch set construction module, a manifold dimensionality module, and a training module. The patch set construction module is configured to construct a patch set based, at least in part on training data. The manifold dimensionality module is configured to determine a dimensionality of a manifold. The training module is configured to optimize a combination loss function including a network loss function and the manifold dimensionality. The optimizing the combination loss function includes optimizing at least one network parameter.

In some embodiments of the system, the training data includes at least one of paired images and/or unpaired images, the paired images corresponding to synthesized paired data, and the unpaired images corresponding to unpaired clinical data.

In some embodiments of the system, the patch set construction module includes at least one of an artifact correction branch and an artifact-free branch.

In some embodiments of the system, each branch includes an encoder, a decoder and a convolution layer.

In some embodiments of the system, the network loss function is selected from the group including a paired learning supervised loss function, and an unpaired learning artifact disentanglement network loss function.

In some embodiments of the system, the optimizing includes adversarial learning.

In some embodiments, there is provided a computer readable storage device. The device has stored thereon instructions that when executed by one or more processors result in the following operations including any embodiment of the method.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

Figure 1:
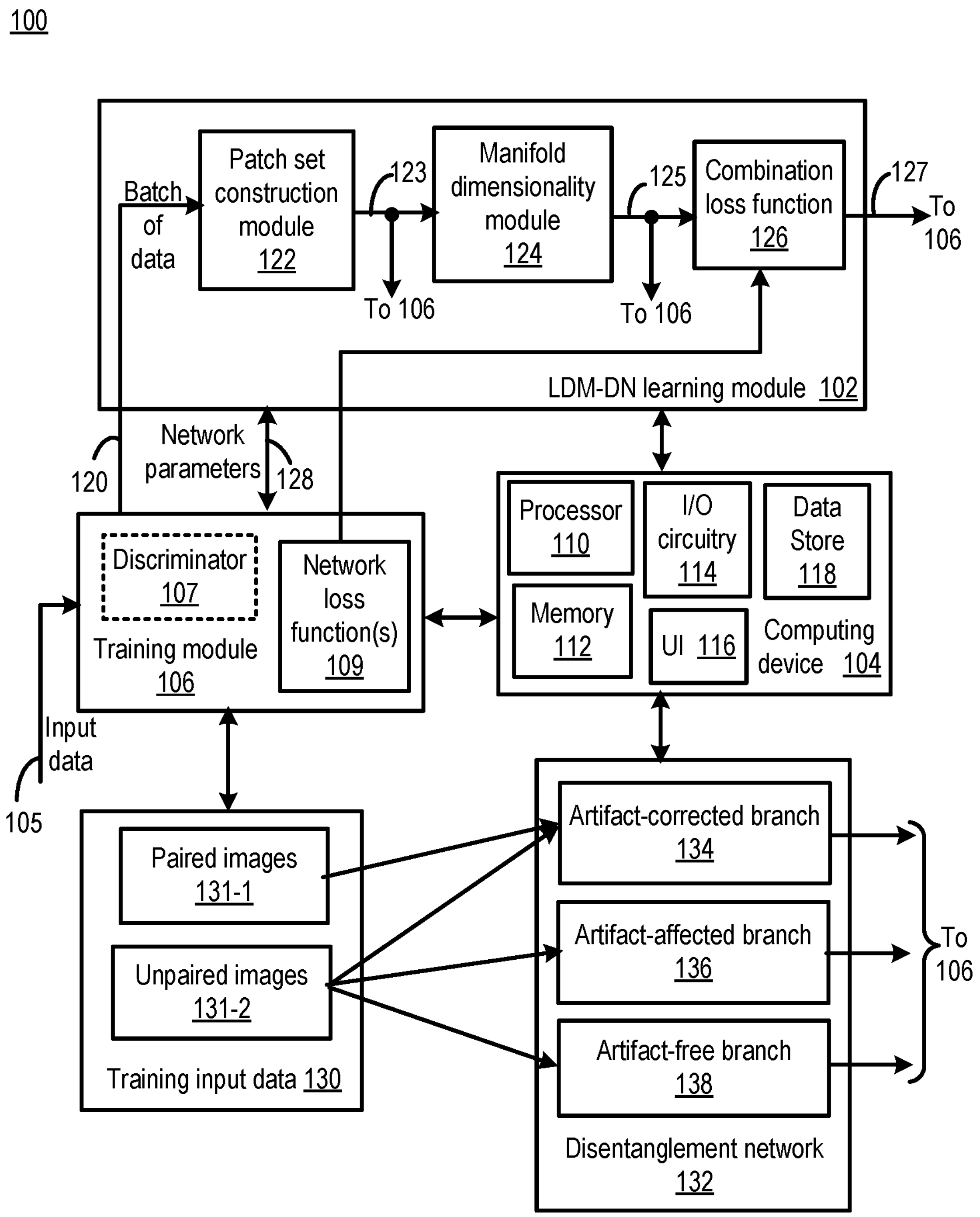
FIG. 1 illustrates a functional block diagram of a system for metal artifact reduction (MAR) in computed tomography (CT) images, according to several embodiments of the present disclosure.

Although the following Detailed Description will proceed with reference being made to illustrative embodiments, many alternatives, modifications, and variations thereof will be apparent to those skilled in the art.

DETAILED DESCRIPTION

Metal artifact reduction (MAR) techniques may be configured to correct projection data, e.g., using interpolation. An artifact-reduced image may then be reconstructed from the corrected projection data using, for example, filtered back projection (FBP). However, projection domain techniques may produce secondary artifacts, and/or projection data may not be freely available.

Additionally or alternatively, MAR techniques may be performed in the image domain, and/or dual (i.e., both projection and image) domain. Such MAR techniques may include, for example, deep learning techniques. Many deep learning based methods are fully-supervised, and rely on a relatively large number of paired training images. In fully-supervised deep learning techniques, each artifact-affected image is associated with a co-registered artifact-free image. In clinical scenarios, it may be relatively infeasible to acquire a large number of such paired images. Additionally or alternatively, training techniques may include simulating artifact-affected images by, for example, inserting metal objects into artifact-free images so that paired images are obtained. Simulated images may not reflect all real conditions due to the complex physical mechanism of metal artifacts and many technical factors of the imaging system, degrading the performance of the fully-supervised models.

Deep neural network based methods have achieved promising results for CT metal artifact reduction (MAR), most of which may be configured to use a relatively large number of synthesized paired images for supervised learning. As synthesized metal artifacts in CT images may not accurately reflect the clinical counterparts, an artifact disentanglement network (ADN) may be configured to utilize unpaired clinical images (including clinical images with and without metal artifacts). An ADN may be configured to learn using a generative adversarial network (GAN) framework and a corresponding discriminator may be configured to assess relatively large regions as artifact-free or artifact-affected.

In an embodiment, a low-dimensional manifold (LDM) constrained disentanglement network (DN), according to the present disclosure may be configured to leverage an image characteristic that a patch manifold of a CT image may generally be low-dimensional. In one nonlimiting example, an LDM-DN learning technique may be configured to train a disentanglement network through optimizing one or more loss functions used in ADN while constraining the recovered images to be on a low-dimensional patch manifold. Additionally or alternatively, a hybrid optimization technique may be configured to learn from both paired and unpaired data, and may result in a relatively better MAR performance on clinical datasets.

Generally, this disclosure relates to metal artifact reduction, in particular to, a low-dimensional manifold (LDM) constrained disentanglement network (DN) for metal artifact reduction (MAR). A method, apparatus and/or system may be configured to reduce metal artifacts in CT images. In some embodiments, the apparatus, method and/or system may include a patch set construction module, a manifold dimensionality module, and a training module. The patch set construction module is configured to construct a patch set based, at least in part on training data. The manifold dimensionality module is configured to determine a dimensionality of a manifold. The training module is configured to optimize a combination loss function comprising a network loss function and the manifold dimensionality. The optimizing the combination loss function includes optimizing at least one network parameter.

A generic neural network based MAR method in the image domain may be configured to utilize paired artifact-affected and corresponding artifact-free images. In a supervised learning mode, the paired data $$\{x_i^a, x_i^{gt}\}_{i=1}^N$$

may be available, where each artifact-affected image $$x_i^a$$

has a corresponding artifact-free image $$x_i^{gt}$$

as a respective ground truth, and N is the number of paired images. A deep neural network for metal artifact reduction may then be trained on this dataset by minimizing the following loss function (Eq. (1)):

$$\mathcal{L}_{sup}(\theta) = \frac{1}{N}\sum_{i=1}^{N}\ell\left(g(x_i^a;\theta), x_i^{gt}\right) \tag{1}$$

where $\ell$ denotes a loss function, such as the L1-distance function, and $$g(x_i^a;\theta)$$

represents a predicted artifact-free image of the artifact-affected imaged $$x_i^a$$

by the neural network function g with a parameter vector θ to be optimized. In practice, a large number of paired data may be synthesized for training the model, as clinical datasets may generally contain only unpaired images.

To improve the MAR performance on clinical datasets, an ADN technique may be configured to map a generative adversarial learning-based disentanglement network for MAR, using an unpaired dataset, $$\{x_i^a; y_j\}, i = 1, \ldots, N_1, j = 1, \ldots, N_2,$$

where $y_j$ represents an artifact-free image that is not paired with $$x_i^a,$$

and $N_1$ and $N_2$ denote a number of artifact-affected and a number of artifact free images, respectively. The ADN model may include a number of encoders and decoders. Each encoder and each decoder may correspond to a respective artificial neural network (ANN), e.g., a convolutional neural network (CNN), a multilayer perceptron (MLP), etc. The encoders and decoders may be trained with a number of loss functions, including, but not limited to, two adversarial losses, a reconstruction loss, a cycle-consistent loss, and an artifact-consistent loss. The ADN loss function may then be written as:

$$\mathcal{L}_{adn}(\theta) = \frac{1}{N_1 N_2} \sum_{i=1}^{N_1} \sum_{j=1}^{N_2} \ell_{adn}(f([x_i^a, y_j], \theta), [y_j, x_i^a]) \quad (2)$$

where $l_{adn}$ is a combination of some or all losses of ADN, $f(\bullet)$ represents a general function of the ADN modules during training and has multiple inputs and outputs. The parameter θ is configured to include corresponding parameters of all modules in ADN. For example, losses of AND may include two adversarial losses that respectively remove or add metal artifacts, a reconstruction loss to preserve original content and avoid "fake" regions/tissues, an artifact consistency loss to enforce that removed and synthesized metal artifacts be consistent, and a self-reduction loss configured to constrain that clean images can be recovered from synthesized artifact-affected images. In an embodiment, during training, all loss functions may be optimized simultaneously.

In an embodiment, a general image property known as low-dimensional manifold (LDM) may be configured to improve an MAR performance compared to ADN alone. For example, a patch set of artifact-free images may sample a low-dimensional manifold. An MAR problem may then be formulated as:

$$\min_{\theta, \mathcal{M}} \mathcal{L}(\theta) + \lambda dim(\mathcal{M}(P(\theta)) \quad (3)$$

where P(θ) corresponds to a patch set of artifact-free and/or artifact-corrected images and is determined by the network parameters θ. $\mathcal{M}$ corresponds to a smooth manifold isometrically embedded in the patch space, $\mathcal{L}$ (θ) may be any network loss functions, such as $\mathcal{L}_{sup}$ for paired (i.e., supervised) learning or $\mathcal{L}_{adn}$ for unpaired (i.e., unsupervised or weakly supervised) learning, and λ corresponds to a balance hyperparameter. Network parameters may be optimized by constraining the predicted patch set P(θ) to have a low-dimensional manifold for some or all training images.

To solve the above optimization problem, the construction of a patch set, the computation of a manifold dimensionality, and the learning algorithm for simultaneously optimizing the network loss functions and the dimensionality of a patch manifold may all be specified. Each of these components will be described in more detail below.

In one embodiment, there is provided an apparatus for low-dimensional manifold constrained disentanglement for metal artifact reduction (MAR) in computed tomography (CT) images. The apparatus includes a patch set construction module, a manifold dimensionality module, and a training module. The patch set construction module is configured to construct a patch set based, at least in part on training data. The manifold dimensionality module is configured to determine a dimensionality of a manifold. The training module is configured to optimize a combination loss function comprising a network loss function and the manifold dimensionality. The optimizing the combination loss function includes optimizing at least one network parameter.

FIG. 1 illustrates a functional block diagram of a system 100 for metal artifact reduction (MAR) in computed tomography (CT) images, according to several embodiments of the present disclosure. System 100 includes LDM-DN learning module 102, a computing device 104, and a training module 106. LDM-DN learning module 102 and/or training module 106 may be coupled to or included in computing device 104. The LDM-DN learning module 102 is configured to receive a batch of data 120 from the training module 106 and to provide a combination loss function output 127 to the training module 106, as will be described in more detail below. The batch of data 120 may include paired images or unpaired images, as described herein. The combination loss function output 127 may correspond to a value of the combination loss function, during optimization operations.

LDM-DN learning module 102 includes a patch set construction module 122, a manifold dimensionality module 124, and a combination loss function 126. The patch set construction module 122 may include and/or may correspond to a neural network. As used herein, "neural network" (NN) and "artificial neural network" (ANN) are used interchangeably. A neural network may include, but is not limited to, a deep ANN, a convolutional neural network (CNN), a deep CNN, a multilayer perceptron (MLP), etc. In an embodiment, patch set construction module 122 may include one or more encoder neural networks ("encoders") and one or more decoder neural networks ("decoders"), as described herein.

The training module 106 may include a discriminator 107 and may include one or more network loss function(s) 109. In some embodiments, the combination loss function 126 may be included in the training module 106. In some embodiments, the network loss function(s) 109 may be included in the LDM-DN learning module 102, e.g., in the combination loss function 126. The training module 106 may be configured to select one or more network loss function(s) for inclusion in LDM-DN learning module 102 operations, as described herein.

Computing device 104 may include, but is not limited to, a computing system (e.g., a server, a workstation computer, a desktop computer, a laptop computer, a tablet computer, an ultraportable computer, an ultramobile computer, a netbook computer and/or a subnotebook computer, etc.), and/or a smart phone. Computing device 104 includes a processor 110, a memory 112, input/output (I/O) circuitry 114, a user interface (UI) 116, and data store 118.

Processor 110 is configured to perform operations of LDM-DN learning module 102 and/or training module 106. Memory 112 may be configured to store data associated with LDM-DN learning module 102 and/or training module 106. I/O circuitry 114 may be configured to provide wired and/or wireless communication functionality for system 100. For example, I/O circuitry 114 may be configured to receive input data 105. UI 116 may include a user input device (e.g., keyboard, mouse, microphone, touch sensitive display, etc.) and/or a user output device, e.g., a display. Data store 118 may be configured to store one or more of input data 105, batch of data 120, combination loss function output 127, network parameters 128, training input data 130, and/or data associated with LDM-DN learning module 102 and/or training module 106.

Training module 106 is configured to receive input data 105. Input data 105 may include, for example, a plurality of image data records. Each image data record may correspond to CT image data. The input data 105 may include paired images, e.g., synthesized paired image data, and/or unpaired images, e.g., unpaired clinical data. Training module 106 may be configured to store the input data 105 in training input data 130 as paired images 131-1 and unpaired images 131-2. Training module 106 may be configured to generate batches of data, e.g., batch of data 120, that may then be provided to LDM-DN learning module 102, and patch set construction module 122. Each batch of data 120 may include one or more image pairs from paired images 131-1 and a plurality of unpaired images 131-2, as described herein.

Training module 106 is configured to manage training of LDM-DN learning module 102. Training module 106 may thus be configured to provide each batch of data 120 to patch set construction module 122. Patch set construction module 122 is configured to construct a patch set 123 based, at least in part, on the batch of data 120 and to provide each patch set 123 to manifold dimensionality module 124 and to training module 106. Manifold dimensionality module 124 is configured to receive the patch set(s) 123, to determine a dimensionality 125 of the manifold and to provide the manifold dimensionality 125 to the combination loss function 126. The combination loss function 126 may include one or more network loss function(s) 109 and the manifold dimensionality 125, and a value 127 of the combination loss function (i.e., combination loss function output) may be provided to the training module 106. The training module 106 may be configured to optimize the combination loss function 126 by adjusting and/or optimizing network parameters 128. In one nonlimiting example, training module 106 may include discriminator 107 and the adjusting network parameters 128 may correspond to a generative adversarial network (GAN) framework. Continuing with this example, a generator in the GAN framework may correspond to an encoder, in a decoder-encoder network, as described herein. The GAN framework may thus facilitate optimizing network parameters 128, as described herein.

Thus, training operations may be configured to optimize network parameters 128 based, at least in part, on paired images and/or unpaired images. The network parameter 128 optimizations may be related to one or more patch sets, a manifold dimensionality related to the patch sets, and/or the combination loss function, as described herein.

Figure 2:
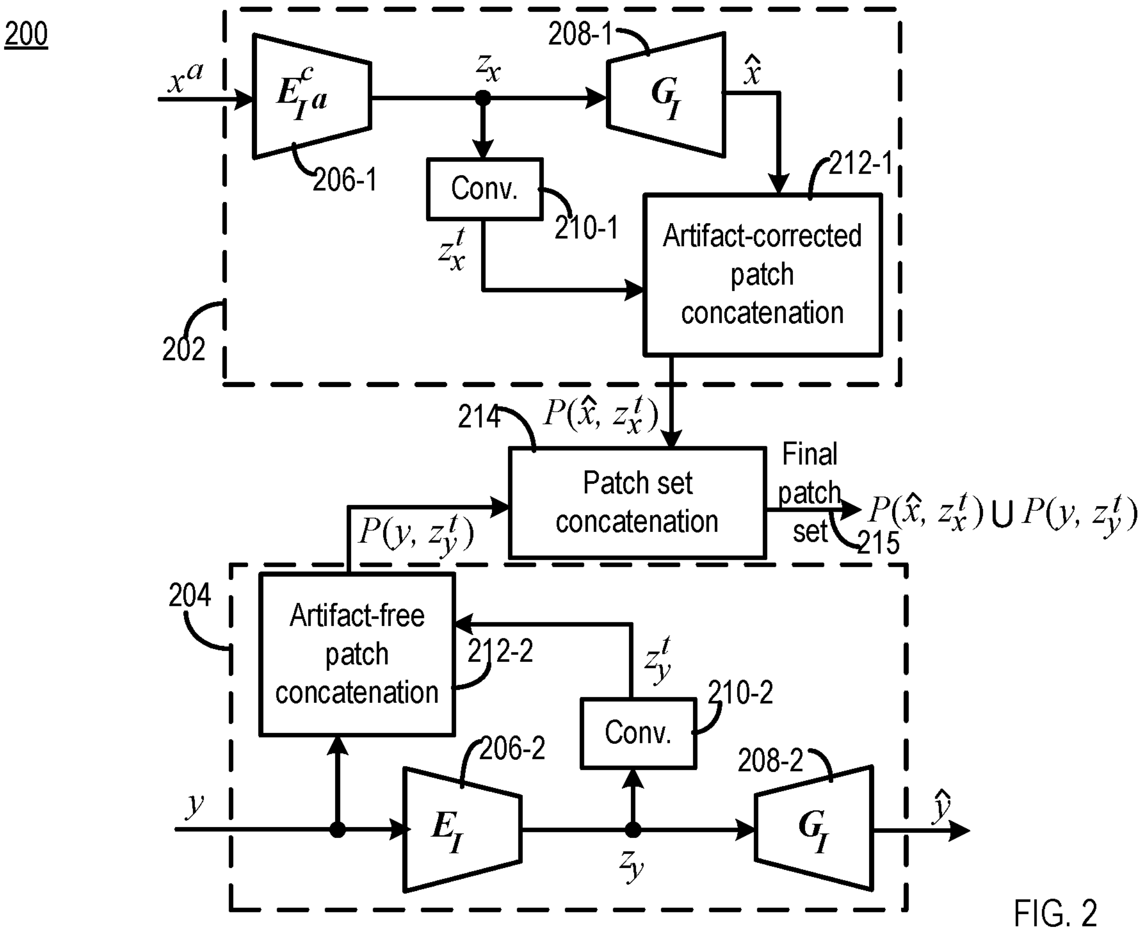
FIG. 2 illustrates a functional block diagram of an example patch set construction module, according to an embodiment of the present disclosure.

FIG. 2 illustrates a functional block diagram of an example patch set construction module 200, according to an embodiment of the present disclosure. Patch set construction module 200 includes a first branch 202, corresponding to an artifact-correction branch and a second branch 204 corresponding to an artifact-free branch. It may be appreciated that a ADN model may include four branches. The example patch set construction module 200 includes two branches to illustrate patch construction. The artifact-affected images in the other branches may not be constrained to have an LDM.

Each branch 202, 204 includes a respective encoder 206-1, 206-2, configured to receive a respective input, and further includes a respective decoder 208-1, 208-2 configured to provide a respective output. Each branch 202, 204 further includes a respective convolution layer 210-1, 210-2, and a respective concatenation block 212-1, 212-2. The patch set construction module 200 further includes a patch set concatenation block 214 configured to receive respective patch sets, and to provide a final patch set 215 as output. The first branch 202, i.e., the artifact—correction branch, is configured to receive an artifact-affected image, $x^a$, and to provide as output a patch set of artifact—corrected images, $$P(\hat{x}, z_x^t).$$

The second branch 204, i.e., the artifact—free branch, is configured to receive an artifact—free image, y, and to provide is output a patch set of original images, $$P(y, z_y^t).$$

Thus, an LDM-based optimization framework, according to the present disclosure, may include a disentanglement network under different levels of supervision. A patch set may be constructed based, at least in part, on its two branches, i.e., branches 202, 204. The first branch 202 corresponds to an artifact-correction branch configured to map an artifact-affected image $x^a$ to an artifact-corrected image $\hat{x}$, and a second branch 204 corresponds to an artifact-free branch that maps an artifact-free image y to itself $\hat{y}$. Considering the spatial correspondence between the input/output image and its convolutional feature maps, each image patch and its feature vectors may be concatenated (e.g., by artifact—corrected patch concatenation block 212-1 for the artifact—correction branch 202, and by artifact—free patch concatenation block 212-2 for the artifact—free branch 204), to represent the patch. It may be appreciated that each feature vector in a set of learned convolutional feature maps may correspond to a relatively fine-gained image patch. The relatively high-level feature vectors of the encoder can be used to enhance the representation ability of pixel values. The artifact-correction branch 202 may include patches from the artifact-corrected images, denoted as $$\{P_i(\hat{x}, z_x^t)\},$$

where $$z_x^t$$

corresponds to a transformed version of an original latent code in ADN using a convolutional layer. This transformation is configured to compress the feature channels so that the dimension of a feature vector may be equal to the corresponding dimension of the patch vector. Similarly, the artifact-free branch 204 may include patches from the original images, denoted as $$\{P(y, z_y^t)\}.$$

where $$z_y^t$$

corresponds to the transformed latent code of $z_y$. The patch set of the images without artifacts is configured to sample a low-dimensional manifold. The final patch set 215 is then the concatenation of these two patch sets, i.e., $$\{P_i(\hat{x}, z_x^t)\} \cup P(y, z_y^t)\}.$$

Since the patches may be determined by the network parameters θ and input images, a patch set constructed from all possible unpaired images may be denoted as $$P(\theta) = \{P(\hat{x}, z_x^t) \cup P(y, z_y^t)\}.$$

In one nonlimiting example, the input image size is H×W and the step size is s for downsampling the encoder features. The patch size is s×s, the dimension of $$z_x^t$$

or $$z_y^t$$

is $$s^2 \times \frac{H}{s} \times \frac{W}{s},$$

and each patch vector $P_j(\theta) \in R^d$, $d=2s^2$. However, this disclosure is not limited in this regard.

Thus, a patch set, e.g., patch set 123 of FIG. 1, may be constructed using, for example, example patch set construction module 200.

A dimensionality, dim($\mathcal{M}$), of a patch manifold $\mathcal{M}$ may then be determined by, for example, manifold dimensionality module 124. For a smooth submanifold, $\mathcal{M}$, isometrically embedded in $R^d$, for any patch, $P_j(\theta) \in \mathcal{M}$, a dimensionality dim($\mathcal{M}$) of a patch manifold $\mathcal{M}$ may be expressed as:

$$dim(\mathcal{M}) = \sum_{i=1}^{d} \|\nabla_{\mathcal{M}} \alpha_i(P_j(\theta))\|^2 \quad (4)$$

where $\alpha_i(\bullet)$ is a coordinate function, i.e., $$\alpha_i(P_j(\theta)) = P_j^i(\theta),$$

where $$P_j^i$$

(θ) is the $i^{th}$ element in the patch vector $P_j(\theta)$, and $\nabla_{\mathcal{M}} \alpha_i(P_j(\theta))$ corresponds to the gradient of the function $\alpha_i$ on $\mathcal{M}$. In an embodiment, the patch may be parameterized by the network parameter vector θ.

According to the construction of a patch set and the definition of a patch manifold dimensionality, Eq. (3) may be reformulated as:

$$\min_{\theta,\mathcal{M}} \mathcal{L}(\theta) + \sum_{i=1}^{d} \|\nabla_{\mathcal{M}} \alpha_i\|^2_{L^2(\mathcal{M})}, \quad (5)$$

$$\text{s.t. } P(\theta) \subset \mathcal{M}.$$

where $$\|\nabla_{\mathcal{M}} \alpha_i\|_{L^2(\mathcal{M})} = \left(\int_{\mathcal{M}} \|\nabla_{\mathcal{M}} \alpha_i(p)\|^2 dp\right)^{1/2} \quad (6)$$

where Eq. (6) corresponds to a continuous version of Eq. (4), and $p \in \mathcal{M}$ is a patch vector and equivalent to $P_j(\theta)$. An iterative algorithm, e.g., LDM-DN (Low Dimensional Manifold-Disentanglement Network), may be configured to optimize the LDM-constrained disentanglement network. The LDM-DN may be configured to optimize the parameters of neural networks using a plurality (e.g., some or all) of training images.

For example, given $(\theta^k, \mathcal{M}^k)$ at step k satisfying $$P_{\theta^k}^k \subset \mathcal{M}^k,$$

step k+1 may include the following sub-steps:

Update $\theta^{k+1}$ and $$\alpha^{k+1} = (\alpha_1^{k+1}, \ldots, \alpha_d^{k+1})$$

as the minimizers of the following objective with the fixed manifold $\mathcal{M}^k$:

$$\min_{\theta,\alpha} \mathcal{L}(\theta) + \sum_{i=1}^{d} \|\nabla_{\mathcal{M}} \alpha_i\|^2_{L^2(M)}, \quad (7)$$

-continued $$\text{s.t. } \alpha_i\big(P_j(\theta^k)\big) = P_j^i(\theta)$$

Update $\mathcal{M}^{k+1}$:

$$\mathcal{M}^{k+1} = \left\{\left(\alpha_1^{k+1}(p), \ldots, \alpha_d^{k=1}(p)\right) : p \in \mathcal{M}^k\right\} \tag{8}$$

Repeat above two sub-steps until convergence.

It is noted that if the iteration converges to a fixed point, $\alpha^{k+1}$ may be relatively very close to the coordinate functions, and $\mathcal{M}^{k+1}$ and $\mathcal{M}^{k}$ may be relatively very close to each other.

Eq. (7) corresponds to a constrained linear optimization problem, which may be solved using the alternating direction method of multipliers. The above optimization algorithm may thus be reduced to the following iterative procedure:

Update $$\alpha_i^{k+1},$$

i=1, . . . , d, with a fixed $P(\theta^k)$, $$\alpha_i^{k+1} = \underset{\alpha_i}{\operatorname{argmin}} \sum_{i=1}^{d} \|\nabla_{\mathcal{M}}\alpha_i\|^2_{L^2(\mathcal{M}^k)} + \mu\left\|\alpha\big(P(\theta^k)\big) - P(\theta^k) + d^k\right\|_F^2. \tag{9}$$

where $\alpha(P(\theta^k))=[\alpha_i(P_j(\theta^k))]^{m\times d}$ and $$P(\theta^k) = \left[P_j^i(\theta^k)\right]^{m\times d}$$

are matrices, and m is the number of patch vectors.

Update $\theta^{k+1}$, $$\theta^{k+1} = \underset{\theta}{\operatorname{argmin}}\ \mathcal{L}(\theta) + \mu\left\|\alpha^{k+1}\big(P(\theta^k)\big) - P(\theta) + d^k\right\|_F^2 \tag{10}$$

Update $d^{k+1}$, $$d^{k+1} = d^k + \alpha^{k+1}\big(P(\theta^k)\big) - P(\theta^{k+1}) \tag{11}$$

where $d^k$ is the dual variable.

Using the standard variational approach, the solutions to the objective function (9) can be obtained by solving the following PDE (partial differential equation):

$$-\Delta_{\mathcal{M}} u(p) + \mu\sum_q \delta(p-q)(u(q)-v(q)) = 0, \quad p \in \mathcal{M} \tag{12}$$

$$\frac{\partial u}{\partial n}(p) = 0, \quad p \in \partial\mathcal{M}.$$

where $\partial\mathcal{M}$ is the boundary of $\mathcal{M}$, and n is the out normal of $\partial\mathcal{M}$. It may be appreciated that the variables p and q mean the patch vectors that may be determined by the network parameter vector $\theta$, which is not explicitly denoted for simplicity. Eq. (12) can be solved with the point integral method. The following integral approximation may be used for solving the Laplace-Beltrami equation:

$$\int_{\mathcal{M}} \Delta_{\mathcal{M}} u(q)\bar{R}_t(p, q)dq \approx -\frac{1}{t}\int_{\mathcal{M}}(u(p)-u(q))R_t(p, q)dq + 2\int_{\partial\mathcal{M}} \frac{\partial u(q)}{\partial n}\bar{R}_t(p, q)d\tau_q, \tag{13}$$

where t>0 is a hyper parameter and $$R_t(p, q) = C_t R\left(\frac{|p-q|^2}{4t}\right). \tag{14}$$

$R:R^+\rightarrow R^+$ is a positive $C^2$ function which may be integrable over $[0,+\infty)$, and $C_T$ is a normalizing factor:

$$\bar{R}(r) = \int_r^{+\infty} R(s)ds, \text{ and } \bar{R}_t(p, q) = C_t\bar{R}\left(\frac{|p-q|^2}{4t}\right) \tag{15}$$

It may be appreciated that $R(r)=e^{-r}$, then $$\bar{R}_t(p, q) = R_t(p, q) = C_t\exp\left(\frac{|p-q|^2}{4t}\right)$$

is Gaussian.

Based on the above integral approximation, the original Laplace-Beltrami equation may be approximated as:

$$\int_{\mathcal{M}}(u(p-u(q))R_t(p, q)dq + \mu t\sum_{q\in\omega}\bar{R}_t(p, q)(u(q)-v(q)) = 0 \tag{16}$$

This integral equation may then be discretized over a point cloud.

To simplify the notation, the patch set, $P(\theta^k)$, may be denoted as $$P(\theta^k) = \{p_i\}_{i=1}^m,$$

where m is the number of patches. It may be assumed that the patch set is configured to sample the submanifold $\mathcal{M}$ and made me uniformly distributed. The integral equation may then be written as:

$$\frac{|\mathcal{M}|}{m}\sum_{j=1}^{m} R_t(p_i, p_j)(u_i-u_j) + \mu t\sum_{j=1}^{m}\bar{R}_t(p_i, p_j)(u_j-v_j) = 0 \tag{17}$$

where $v_j=v(p_j)$, and $|\mathcal{M}|$ is the volume of the manifold $\mathcal{M}$. Eq. (17) may be rewritten in the matrix form as:

$$(L+\bar{\mu}W)u = \bar{\mu}Wv. \tag{18}$$

$$\text{where } v = (v_1, \ldots, v_m), \bar{\mu} = \frac{\mu t m}{|\mathcal{M}|},$$

and L is an m×m matrix, $$L = D - W \tag{19}$$

$W=(w_{ij})$, i, j=1, . . . , m is the weight matrix, $D=\mathrm{diag}(d_i)$ with $$d_i = \sum_{j=1}^{m} w_{ij},$$

and $$w_{ij} = R_t(p_i, p_j),\ p_i, p_j \in P(\theta^k),\ i, j = 1, \ldots, m. \tag{20}$$

the solutions to the objective function (9) may then be obtained by solving u in Eq. (18).

One embodiment of the LDM-DN learning algorithm is described in Algorithm 1, where it is assumed that the patch set of all images samples a low-dimensional manifold. It may be impractical to optimize the LDM problem when the number of patches is relatively very large. A batch of images may be randomly selected in order to construct the patch set. The coordinate functions U may then be estimates. The network parameters θ and dual variables d may then be updated in each iteration. Thus, in an embodiment, the number of iterations in training the network is the same as that in a corresponding LDM optimization. It may be appreciated that the values of d may increase as the number of iterations increases. As the number of iterations may be relatively very large, the loss value of the LDM term in Step 6 of Algorithm 1 may become increasingly large, and may lead to an instability. To overcome this potential instability, the dual variables may be normalized in Step 7 of Algorithm 1. In one nonlimiting example, the LDM-involved parameters, μ, and $d^0$, may be set: μ=0.5 and $d^0$=0. However, this disclosure is not limited in this regard.

Algorithm 1: LDM-DN Learning algorithm

Input: DataSet including unpaired training data $\{x_i^a, y_j\}_{i=1,j=2}^{N_1,N_2}$ and/or paired training data $\{(x_i^a, x_i^{gt})\}_{i=1}^{N}$, initial network parameters $\theta^0$, initial dual variables $d^0$, hyperparameters λ and μ, the number of training epochs E, and the batch size bs.
Output: Network parameters θ*.
1: for e ∈ {1, . . . ,E} do
2: for B ∈ DataSet do
3: Compute the outputs of the disentanglement network given a batch of data $B = \{x_i^a, y_i\}_{i=1}^{bs}$ or $B = \{x_i^a, y_i\}_{i=1}^{bs} \cup \{(x_i^a, x_i^{gt})\}_{i=1}^{bs}$, and construct the patch set, $P(\theta^k)$, as described herein.
4: Compute the weight matrix $W = (w_{ij})$ and L with $P(\theta^k)$, as in Eqs. (20) and (19).
5: Solve the following linear systems to obtain U: $(L + \mu W)U = \mu WV$ , where $V = P(\theta^k) - d^k$.
6: Update $\theta^{k+1}$ using, for example, Adam with the following loss function:
$$J(\theta) = \mathcal{L}(\theta) + \lambda\left\|U - P(\theta^k) + d^k\right\|_F^2.$$

-continued

Algorithm 1: LDM-DN Learning algorithm

7: Construct the patch set $P(\theta^{k+1})$ with $\theta^{k+1}$ and update $d^{k+1}$ as follows:
$\hat{d}^k = d^k + U - P(\theta^{k+1})$,
$$d^{k+1} = \left(\hat{d}^k - \min(\hat{d}^k)\right)/\left(\max(\hat{d}^k) - \min(\hat{d}^k)\right).$$
8: k ← k + 1.
9: end for
10: end for
11: $\theta^* \leftarrow \theta^{(k)}$.

Thus, the network parameters, e.g., network parameters 128 of FIG. 1, may be determined.

Turning again to FIG. 1, system 100 includes the training input data (i.e., batch of training images) 130 and a disentanglement network 132. The batch of training images 130 and disentanglement network 132 are configured to illustrate a combination of paired and unpaired learning. The disentanglement network 132 includes an artifact—corrected branch 134, and artifact—affected branch 136, and an artifact—free branch 138. In operation, during training, the artifact—corrected branch 134 may receive paired images 131-1 and unpaired images 131-2. The paired images 131-1 correspond to synthesize data, as described herein. The unpaired images 131-2 correspond to unpaired clinical images, as described herein. The artifact—affected branch 136 and the artifact—free branch 138 may receive only unpaired images 131-2. Respective outputs of each branch 134, 136, 138, may be provided to training module 106.

ADN is configured to utilize unpaired clinical images for training so that the performance degradation of a supervised learning model can be avoided when the model is first trained on a synthesized dataset and then transferred to a clinical application. In some situations, a GAN loss based weak supervision may not recover full image details. While synthesized data may not perfectly simulate real scenarios, synthesized data may provide helpful information via strong supervision. To benefit from both the strongly and weakly supervised learning, in an embodiment, a hybrid training scheme may be implemented. During training, both unpaired clinical images and paired synthetic images may be selected to construct a mini-batch. In one nonlimiting example, a number of unpaired images and a number of paired images may be the same. The unpaired images may be used to train all modules, i.e., branches 134, 136, 138, and the paired images may be used to train the artifact-correction branch, i.e., branch 134. The artifact-free and artifact-corrected images may be constrained by the LDM, as described herein. The loss function of such a combination learning strategy may then be written as:

$$\min_{\theta,\mathcal{M}} \mathcal{L}_{adn}(\theta) + \mathcal{L}_{sup}(\theta) + dim(\mathcal{M}(P(\theta))), \tag{21}$$

where each loss term may have a same contribution to the total loss. In an embodiment, all terms may be simultaneously used to optimize the network parameters, e.g., network parameters 128.

Figure 3A:
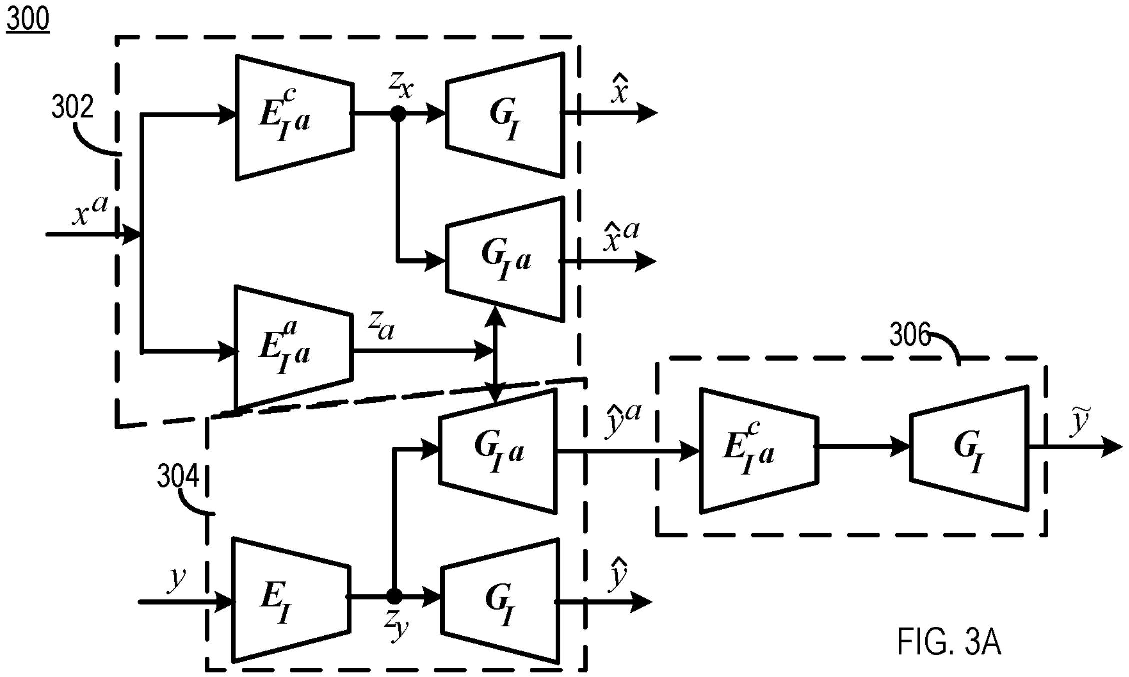
FIGS. 3A through 3D are functional block diagrams of four network architectures corresponding to four learning paradigms, according to various embodiments of the present disclosure.
Figure 3B:
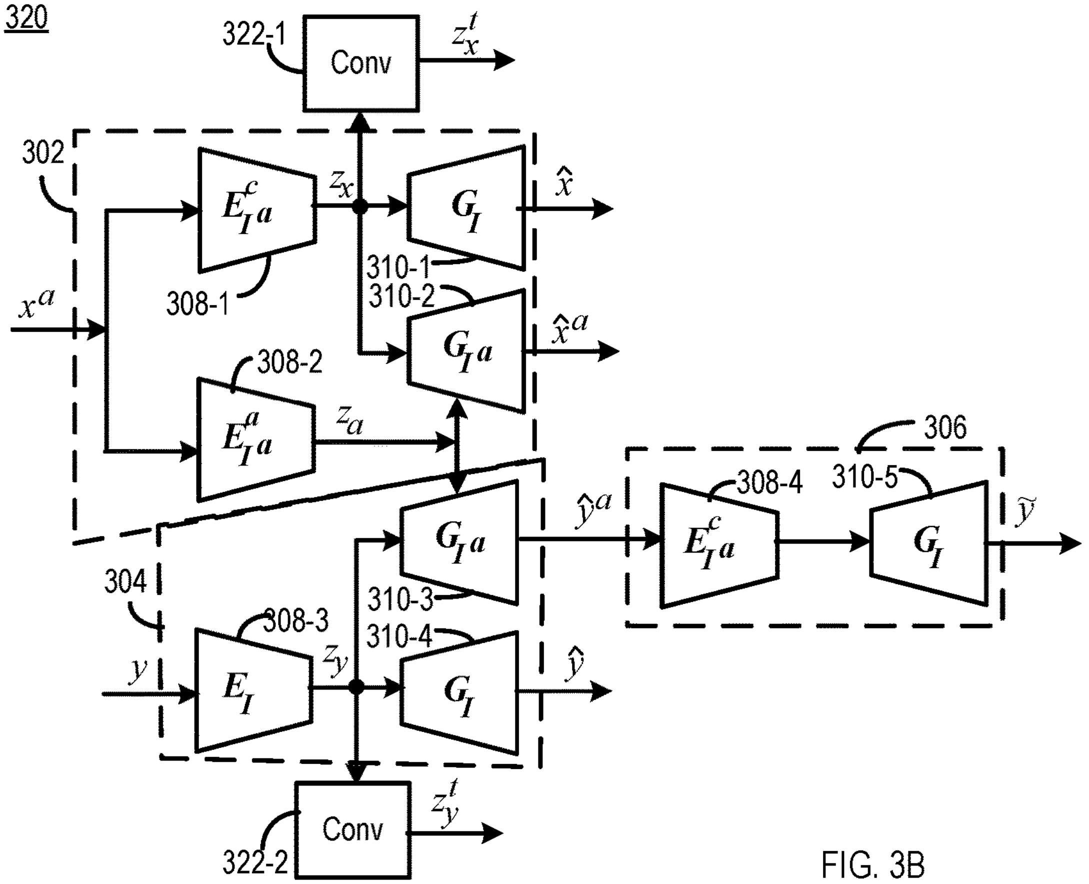
Figure 3C:
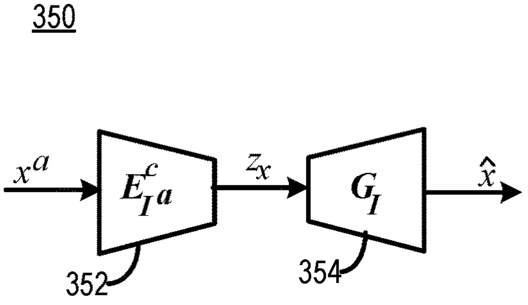
Figure 3D:
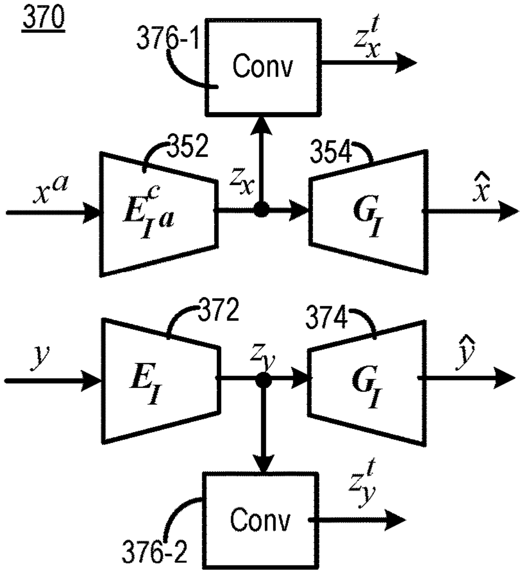

FIGS. 3A through 3D are functional block diagrams of four network architectures corresponding to four learning paradigms, according to various embodiments of the present disclosure. FIG. 3A is a functional block diagram 300 of an ADN architecture (i.e., ADN) and includes an artifact corrected/affected block 302, an artifact-free block 304, and an artifact removal block 306. FIG. 3B is a functional block diagram 320 of a LDM-DN architecture (i.e., LDM-DN), according to an embodiment of the present disclosure. LDM-DN architecture 320 includes an artifact corrected/affected block 302, an artifact-free block 304, and an artifact removal block 306. FIG. 3C is a functional block diagram 350 of a paired learning architecture (i.e., Sup). FIG. 3D is a functional block diagram 370 of a combination of paired learning and LDM architecture (i.e., LDM-Sup). FIGS. 3A through 3D may be best understood when considered together.

In the network architectures 300, 320, 350, 370, encoders $$E^c_{I^a},$$

$$E^a_{I^a}$$

denote the encoders that respectively extract content (i.e., encoders 308-1, 308-4, 352), and artifact features (i.e., encoder 308-2), from artifact-affected images. $E_I$ (i.e., encoder 308-3, 372) is the encoder that extracts content features from the artifact-free images. $G_I$ and $G_{I^a}$ represent the decoders that output the artifact-free/artifact-corrected (i.e., decoders 310-1, 310-4, 310-5, 354, 374) and artifact-affected (i.e., decoders 310-2, 310-3) images, respectively. The combinations of $$E^c_{I^a} \rightarrow G_{I^a}$$

(i.e., encoder 308-1 to decoder 310-1, encoder 308-4 to decoder 310-5, and encoder 352 to decoder 354), $$E^a_{I^a} \rightarrow G_{I^a}$$

(i.e., encoder 308-2 to decoders 310-2, 310-3) or $E_I \rightarrow G_{I^a}$ (i.e., encoder 308-3 to decoder 310-3), and $E_I \rightarrow G_I$ (i.e., encoder 308-3 to decoder 310-4, and encoder 372 to decoder 374) correspond to artifact-corrected, artifact-affected, and artifact-free branches, respectively. Conv denotes a convolutional layer (i.e., 322-1, 322-2, 376-1, 376-2). In network architectures 300 and 320, $E_I \rightarrow G_{I^a}$ (i.e., block 304) is followed by $$E^c_{I^a} \rightarrow G_I$$

(i.e., artifact removal block 306 that includes encoder 308-4 and decoder 310-5) configured to remove the added metal artifacts with a self-reduction loss.

In an embodiment, a respective network architecture variant, i.e., 300, 320, 350, or 370, may be implemented for each learning paradigm, as described herein. For unpaired learning, the architecture of ADN 300 may be implemented, and the architectures 320, 350, 370 of the other learning paradigms are the variants of ADN. In network architecture 320, to construct the patch set for the LDM constraint, two convolutional layers 322-1, 322-2 may be added to the top of the encoders in the artifact-corrected (i.e., encoder 308-1) and artifact-free branches (i.e., encoder 308-3), respectively, as described herein. For paired learning, the encoder-decoder in the artifact-correction branch, (i.e., encoder 352 and decoder 354) may be used as shown in network architecture 350. In combination of paired learning and the LDM constraint, two encoder-decoder branches (encoder 352 and decoder 354, and encoder 372 and decoder 374) may be implemented as shown in network architecture 370.

It may be appreciated that in patch set construction module 200, and network architectures 320, 370, the convolutional layers may be used to compress the channels of the latent code. In one nonlimiting example, the input image size is 1×256×256, the downsampling rate is 8, the matrix of $Z_x$ is of 512×64×64, the matrix of $$Z^t_x$$

is of 64×64×64, the patch size is 8×8, and the dimension of the point in the patch set is 128. In an embodiment, these values may be automatically computed, as described herein.

In one nonlimiting example, a learning technique, according to the present disclosure may be implemented in PyTorch. In one nonlimiting example, in Algorithm 1, the batch size bs may be set to 1 (e.g., to preserve GPU memory) and $\lambda$ may be set to 1 (e.g., to balance the LDM and ADN loss terms). However, this disclosure is not limited in this regard.

Thus, each of a number of network architectures corresponding to a respective learning paradigm, according to various embodiments of the present disclosure.

Thus, a low-dimensional manifold (LDM) constrained disentanglement network (DN), according to the present disclosure may be configured to leverage an image characteristic that a patch manifold of a CT image may generally be low-dimensional. In one nonlimiting example, an LDM-DN learning technique may be configured to train a disentanglement network through optimizing one or more loss functions used in ADN while constraining the recovered images to be on a low-dimensional patch manifold. Additionally or alternatively, a hybrid optimization technique may be configured to learn from both paired and unpaired data, and may result in a relatively better MAR performance on clinical datasets.

Generally, this disclosure relates to metal artifact reduction, in particular to, a low-dimensional manifold (LDM) constrained disentanglement network (DN) for metal artifact reduction (MAR). A method, apparatus and/or system may be configured to reduce metal artifacts in CT images. In some embodiments, the apparatus, method and/or system may include a patch set construction module, a manifold dimensionality module, and a training module. The patch set construction module is configured to construct a patch set based, at least in part on training data. The manifold dimensionality module is configured to determine a dimensionality of a manifold. The training module is configured to optimize a combination loss function comprising a network loss function and the manifold dimensionality. The optimizing the combination loss function includes optimizing at least one network parameter.

Figure 4:
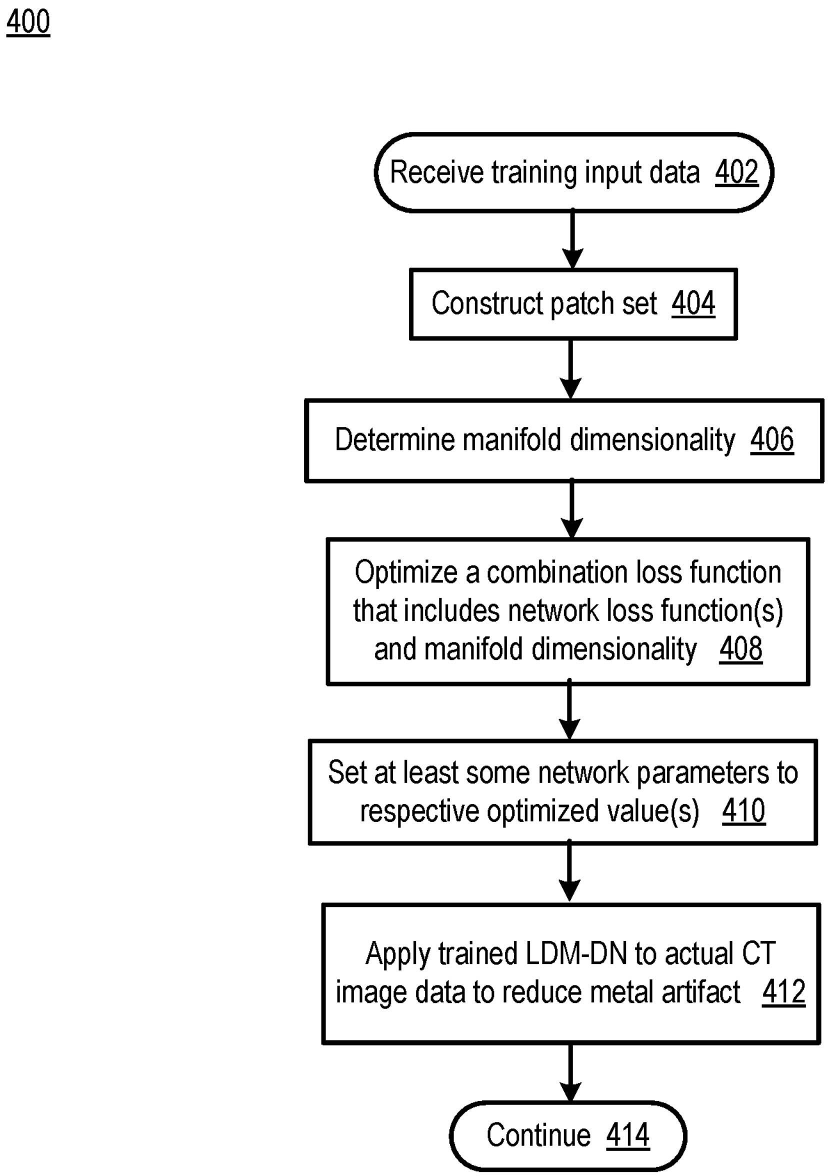
FIG. 4 is a flowchart of operations for metal artifact reduction (MAR) in computed tomography (CT) images, according to various embodiments of the present disclosure.

FIG. 4 is a flowchart 400 of operations for metal artifact reduction (MAR) in computed tomography (CT) images, according to various embodiments of the present disclosure. In particular, the flowchart 400 illustrates optimizing network parameters based, at least in part, on a loss function constrained by manifold dimensionality. The operations may be performed, for example, by the system 100 (e.g., LDM-DN learning module 102, and/or training module 106) of FIG. 1.

Operations of this embodiment may begin with receiving training input data at operation 402. Operation 404 may include constructing a patch set. Operation 406 may include determining a low dimensional manifold dimensionality. Operation 408 may include optimizing a combination loss function that includes a network loss function and the manifold dimensionality. At least some network parameters may be set to respective optimized values at operation 410. In some embodiments, a trained LDM-DN may be applied to actual CT image data to reduce a metal artifact at operation 412. Program flow may then continue at operation 414.

Thus, optimized network parameters may be determined based, at least in part, on a combination loss function that includes network loss function(s) and manifold dimensionality.

Thus, an apparatus, method and/or system, according to the present disclosure, may be configured to reduce metal artifacts in CT images. In an embodiment, the apparatus, method and/or system may include or may correspond to a low-dimensional manifold disentanglement network, as described herein. In some embodiments, the apparatus, method and/or system may include a patch set construction module, a manifold dimensionality module, and a training module. The patch set construction module is configured to construct a patch set based, at least in part on training data. The manifold dimensionality module is configured to determine a dimensionality of a manifold. The training module is configured to optimize a combination loss function comprising a network loss function and the manifold dimensionality. The optimizing the combination loss function includes optimizing at least one network parameter.

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hardwired circuitry, programmable circuitry such as computer processors comprising one or more individual instruction processing cores, state machine circuitry, and/or firmware that stores instructions executed by programmable circuitry. The logic and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus for metal artifact reduction (MAR) in computed tomography (CT) images, the apparatus comprising:

a patch set construction module configured to construct a patch set based, at least in part on training data;

a manifold dimensionality module configured to determine a dimensionality of a manifold related to the patch set; and a training module configured to optimize a combination loss function, the combination loss function comprising a network loss function and the manifold dimensionality, wherein optimizing the combination loss function comprises simultaneously optimizing the network loss function and the manifold dimensionality, and wherein optimizing the combination loss function comprises optimizing at least one network parameter;

wherein the training data comprises paired images and unpaired images, the paired images corresponding to synthesized paired data, and the unpaired images corresponding to unpaired clinical data.

2. The apparatus of claim 1, wherein the patch set construction module comprises at least one of an artifact correction branch and an artifact-free branch.

3. The apparatus of claim 2, wherein each branch comprises an encoder, a decoder and a convolution layer.

4. The apparatus of claim 1, wherein the network loss function is selected from the group consisting of a paired learning supervised loss function, an unpaired learning artifact disentanglement network loss function, and combinations thereof.

5. The apparatus of claim 1, wherein the optimizing comprises adversarial learning.

6. The apparatus of claim 1, wherein the network loss function is associated with a disentanglement network.

7. A method for metal artifact reduction (MAR) in computed tomography (CT) images, the method comprising:

constructing, by a patch set construction module, a patch set based, at least in part on training data;

determining, by a manifold dimensionality module, a dimensionality of a manifold related to the patch set; and optimizing, by a training module, a combination loss function, the combination loss function comprising a network loss function and the manifold dimensionality, wherein optimizing the combination loss includes simultaneously optimizing the network loss function and the manifold dimensionality, and wherein optimizing the combination loss function comprises optimizing at least one network parameter;

wherein the training data comprises paired images and unpaired images, the paired images corresponding to synthesized paired data, and the unpaired images corresponding to unpaired clinical data.

8. The method of claim 7, wherein the patch set construction module comprises at least one of an artifact correction branch and an artifact-free branch.

9. The method of claim 8, wherein each branch comprises an encoder, a decoder and a convolution layer.

10. The method of claim 7, wherein the network loss function is selected from the group comprising a paired learning supervised loss function, and an unpaired learning artifact disentanglement network loss function.

11. The method of claim 7, wherein the optimizing comprises adversarial learning.

12. A system for metal artifact reduction (MAR) in computed tomography (CT) images, the system comprising:

a computing device comprising a processor, a memory, an input/output circuitry, and a data store;

a patch set construction module configured to construct a patch set based, at least in part on training data;

a manifold dimensionality module configured to determine a dimensionality of a manifold related to the patch set; and a training module configured to optimize a combination loss function, the combination loss function comprising a network loss function and the manifold dimensionality, wherein optimizing the combination loss function includes simultaneously optimizing the network loss function and the manifold dimensionality, and wherein optimizing the combination loss function comprises optimizing at least one network parameter;

wherein the training data comprises paired images and unpaired images, the paired images corresponding to synthesized paired data, and the unpaired images corresponding to unpaired clinical data.

13. The system of claim 12, wherein the patch set construction module comprises at least one of an artifact correction branch and an artifact-free branch.

14. The system of claim 13, wherein each branch comprises an encoder, a decoder and a convolution layer.

15. The system of claim 12, wherein the network loss function is selected from the group comprising a paired learning supervised loss function, and an unpaired learning artifact disentanglement network loss function.

16. The system of claim 12, wherein the optimizing comprises adversarial learning.

17. A non-transitory computer readable storage device having stored thereon instructions that when executed by one or more processors result in operations comprising the method according to claim 7.

* * * * *